United States Patent
Todd et al.

(10) Patent No.: US 10,644,936 B2
(45) Date of Patent: May 5, 2020

(54) AD-HOC COMPUTATION SYSTEM FORMED IN MOBILE NETWORK

(71) Applicant: EMC IP Holding Company LLC, Hopkinton, MA (US)

(72) Inventors: Stephen J. Todd, Center Conway, NH (US); Assaf Natanzon, Tel Aviv (IL); Dragan Savic, Brookline, MA (US); Said Tabet, Sherborn, MA (US)

(73) Assignee: EMC IP Holding Company LLC, Hopkinton, MA (US)

(*) Notice: Subject to any disclaimer, the term of this patent is extended or adjusted under 35 U.S.C. 154(b) by 3 days.

(21) Appl. No.: 16/047,718

(22) Filed: Jul. 27, 2018

(65) Prior Publication Data
US 2020/0036585 A1    Jan. 30, 2020

(51) Int. Cl.
*H04L 12/24* (2006.01)
*H04L 12/911* (2013.01)
*H04W 84/18* (2009.01)

(52) U.S. Cl.
CPC ......... *H04L 41/0806* (2013.01); *H04L 47/70* (2013.01); *H04W 84/18* (2013.01)

(58) Field of Classification Search
CPC ..... H04L 41/0806; H04L 47/70; H04W 84/18
See application file for complete search history.

(56) References Cited

U.S. PATENT DOCUMENTS

| 8,886,744 B1* | 11/2014 | Pabla | G06F 9/505 709/217 |
| 2006/0072148 A1* | 4/2006 | Kovnat | G06F 3/122 358/1.15 |
| 2008/0009280 A1* | 1/2008 | Ushiki | H04W 72/042 455/425 |

(Continued)

OTHER PUBLICATIONS grandviewresearch.com, "Smart Cities Market Size, Share & Trends Analysis Report by Application (Education, Governance, Buildings, Mobility, Healthcare, Utilities), by Component (Services, Solutions), and Segment Forecasts 2018-2025," https://www.grandviewresearch.com/industry-analysis/smart-cities-market, Feb. 2018, 8 pages.

(Continued)

*Primary Examiner* — Mohammad S Anwar
(74) *Attorney, Agent, or Firm* — Ryan, Mason & Lewis, LLP

(57) ABSTRACT

An ad-hoc computation system is formed from one or more clusters of idle mobile computing resources to execute an application program within a given time period. The forming step further comprises: (i) determining at least a subset of idle mobile computing resources from the one or more clusters of idle mobile computing resources that are available, or likely to be available, to execute the application program within the given time period, and that collectively comprise computing resource capabilities sufficient to execute the application program within the given time period; and (ii) distributing a workload associated with the (Continued)

execution of the application program to the subset of idle mobile computing resources. The workload associated with the application program is executed via the subset of idle mobile computing resources forming the ad-hoc computation system.

20 Claims, 6 Drawing Sheets

(56) References Cited

U.S. PATENT DOCUMENTS

| | | | | |
|---|---|---|---|---|
| 2009/0158299 A1* | 6/2009 | Carter | ............... | G06F 9/4843 |
| | | | | 719/319 |
| 2010/0169893 A1* | 7/2010 | Collins | ............. | G06F 9/5044 |
| | | | | 718/105 |
| 2012/0159506 A1* | 6/2012 | Barham | ............ | G06F 9/5044 |
| | | | | 718/104 |
| 2018/0315146 A1* | 11/2018 | Matthiesen | ......... | G06Q 50/30 |

OTHER PUBLICATIONS cisco.com, "Cisco Global Cloud Index: Forecast and Methodology, 2016-2021 White Paper," https://www.cisco.com/c/en/us/solutions/collateral/service-provider/global-cloud-index-gci/white-paper-c11-738085.html, Feb. 1, 2018, 46 pages.

U.S. Appl. No. 15/898,443, filed in the name of Kelly G. Kanellakis et al. filed Feb. 17, 2018 and entitled "Ad-Hoc Mobile Computing."

* cited by examiner

100

200

300

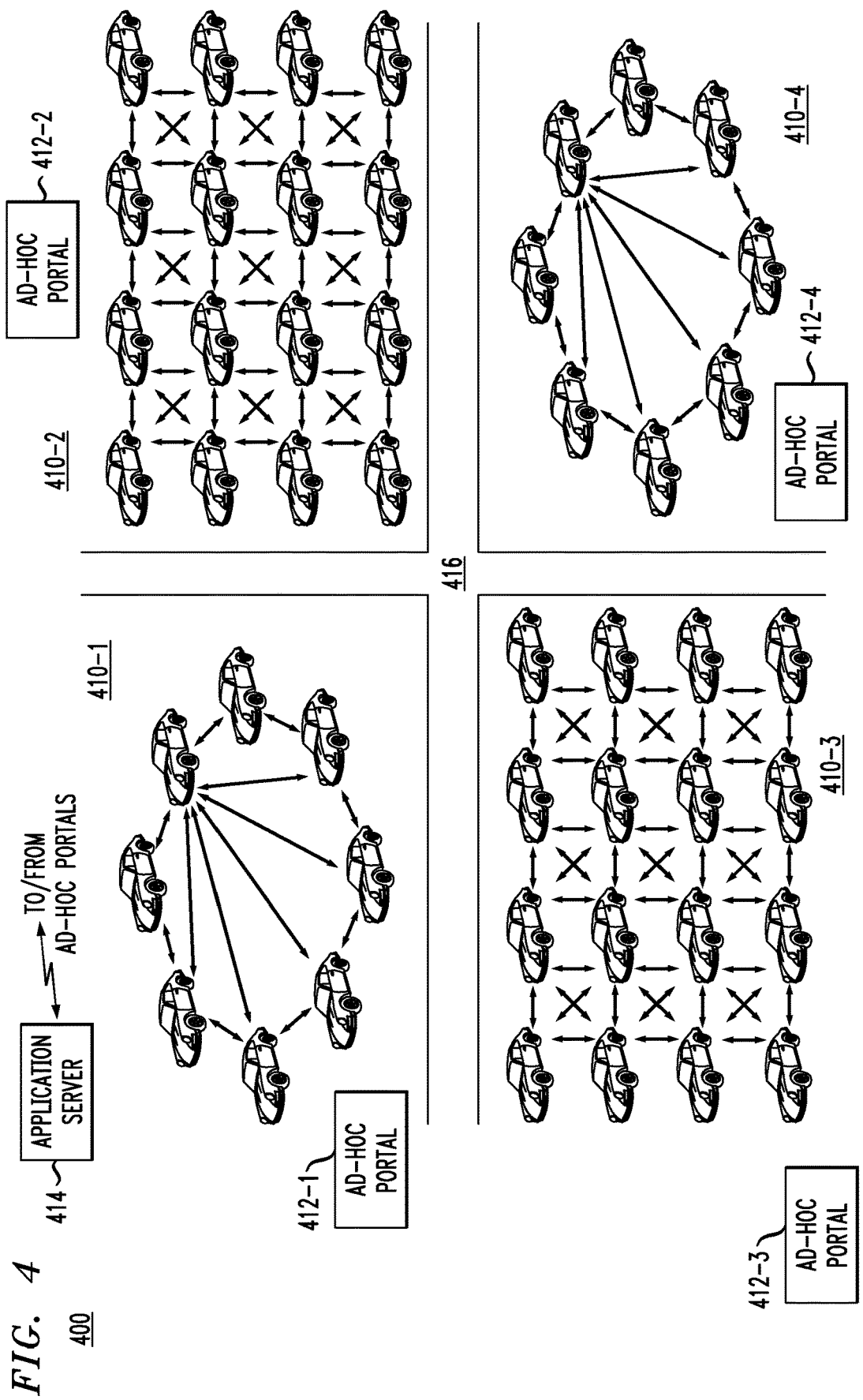

| 502 | AN AD-HOC COMPUTATION SYSTEM IS FORMED FROM ONE OR MORE CLUSTERS OF IDLE MOBILE COMPUTING RESOURCES TO EXECUTE AN APPLICATION PROGRAM WITHIN A GIVEN TIME PERIOD, THE FORMING STEP: (I) DETERMINES AT LEAST A SUBSET OF IDLE MOBILE COMPUTING RESOURCES FROM THE ONE OR MORE CLUSTERS OF IDLE MOBILE COMPUTING RESOURCES THAT ARE AVAILABLE, OR LIKELY TO BE AVAILABLE, TO EXECUTE THE APPLICATION PROGRAM WITHIN THE GIVEN TIME PERIOD, AND THAT COLLECTIVELY COMPRISE COMPUTING RESOURCE CAPABILITIES SUFFICIENT TO EXECUTE THE APPLICATION PROGRAM WITHIN THE GIVEN TIME PERIOD; AND (II) DISTRIBUTES A WORKLOAD ASSOCIATED WITH THE EXECUTION OF THE APPLICATION PROGRAM TO THE SUBSET OF IDLE MOBILE COMPUTING RESOURCES |

↓

504 — THE WORKLOAD ASSOCIATED WITH THE APPLICATION PROGRAM IS EXECUTED VIA THE SUBSET OF IDLE MOBILE COMPUTING RESOURCES FORMING THE AD-HOC COMPUTATION SYSTEM

512 — A GIVEN IDLE MOBILE COMPUTING RESOURCE ADVERTISES COMPUTING RESOURCE CAPABILITIES ASSOCIATED THEREWITH TO AN AD-HOC COMPUTATION SYSTEM IN ORDER TO JOIN A CLUSTER OF IDLE MOBILE COMPUTING RESOURCES FORMED TO EXECUTE A WORKLOAD ASSOCIATED WITH AN APPLICATION PROGRAM WITHIN A GIVEN TIME PERIOD

↓

514 — THE GIVEN IDLE MOBILE COMPUTING RESOURCE NEGOTIATES A PRICE WITH THE AD-HOC COMPUTATION SYSTEM FOR USING ITS ASSOCIATED COMPUTING RESOURCE CAPABILITIES TO EXECUTE AT LEAST A PORTION OF THE WORKLOAD ASSOCIATED WITH THE APPLICATION PROGRAM

↓

516 — THE GIVEN IDLE MOBILE COMPUTING RESOURCE EXECUTES AT LEAST A PORTION OF THE WORKLOAD ASSOCIATED WITH THE APPLICATION PROGRAM AFTER THE ADVERTISING AND NEGOTIATING STEPS

AD-HOC COMPUTATION SYSTEM FORMED IN MOBILE NETWORK

FIELD

The field relates generally to networks of computing resources, and more particularly to techniques for management of ad-hoc computation systems in networks of mobile computing resources.

BACKGROUND

Enterprises or other organizations rely on data centers to fulfill their information technology (IT) needs for executing application programs that enable organizational operations. A data center is typically a centrally-controlled computing system with powerful compute, network, and storage resources that are scalable (added or removed) as organizational operations change. Data centers are very often implemented on one or more cloud platforms.

However, as the need for IT capabilities moves away from the use of centrally-controlled data centers and more towards so-called "edge computing systems" (e.g., computing resources that are highly distributed and not part of a centrally-controlled data center or cloud platform), emerging application programs may still need to leverage data-center-like capabilities. Depending on the type of program, applications may also need edge computing resources for relatively long execution time periods (e.g., multiple hours). Existing edge computing architectures are not configured to address these challenges.

SUMMARY

Embodiments of the invention provide techniques for ad-hoc computation in a mobile network of computing resources such as, by way of example, a highly distributed system.

For example, in an illustrative embodiment, a method comprises the following steps. An ad-hoc computation system is formed from one or more clusters of idle mobile computing resources to execute an application program within a given time period. The forming step further comprises: (i) determining at least a subset of idle mobile computing resources from the one or more clusters of idle mobile computing resources that are available, or likely to be available, to execute the application program within the given time period, and that collectively comprise computing resource capabilities sufficient to execute the application program within the given time period; and (ii) distributing a workload associated with the execution of the application program to the subset of idle mobile computing resources. The workload associated with the application program is executed via the subset of idle mobile computing resources forming the ad-hoc computation system.

In another illustrative embodiment, a method comprises the following steps. A given idle mobile computing resource advertises computing resource capabilities associated therewith to an ad-hoc computation system in order to join a cluster of idle mobile computing resources formed to execute a workload associated with an application program within a given time period. The given idle mobile computing resource negotiates a price with the ad-hoc computation system for using its associated computing resource capabilities to execute at least a portion of the workload associated with the application program. The given idle mobile computing resource executes at least a portion of the workload associated with the application program after the advertising and negotiating steps.

In a further illustrative embodiment, a method comprises the following steps. A given stationary computing resource, in communication with at least one cluster of idle mobile computing resources to form an ad-hoc computation system to execute an application program within a given time period, maintains a directory of availability and computing resource capabilities of the idle mobile computing resources within the cluster. The given stationary computing resource obtains the application program to be executed. The given stationary computing resource distributes a workload associated with the execution of the application program to at least a subset of idle mobile computing resources in the cluster for execution based on availability and computing resource capabilities. The given stationary computing resource sends payment to each of the subset of idle mobile computing resources that participate in the execution of the workload upon completion of participation based on a negotiated price.

Advantageously, illustrative embodiments provide an ad-hoc computation system that determines a set of idle mobile computing resources that are capable of executing an application program for a given time period, e.g., a relatively long execution time period (e.g., multiple hours).

These and other features and advantages of the invention will become more readily apparent from the accompanying drawings and the following detailed description.

BRIEF DESCRIPTION OF THE DRAWINGS

FIG. 4 illustrates an ad-hoc computation system according to a further illustrative embodiment.

FIGS. 5A through 5C are methodologies for an ad-hoc computation system according to illustrative embodiments.

DETAILED DESCRIPTION

Figure 1:
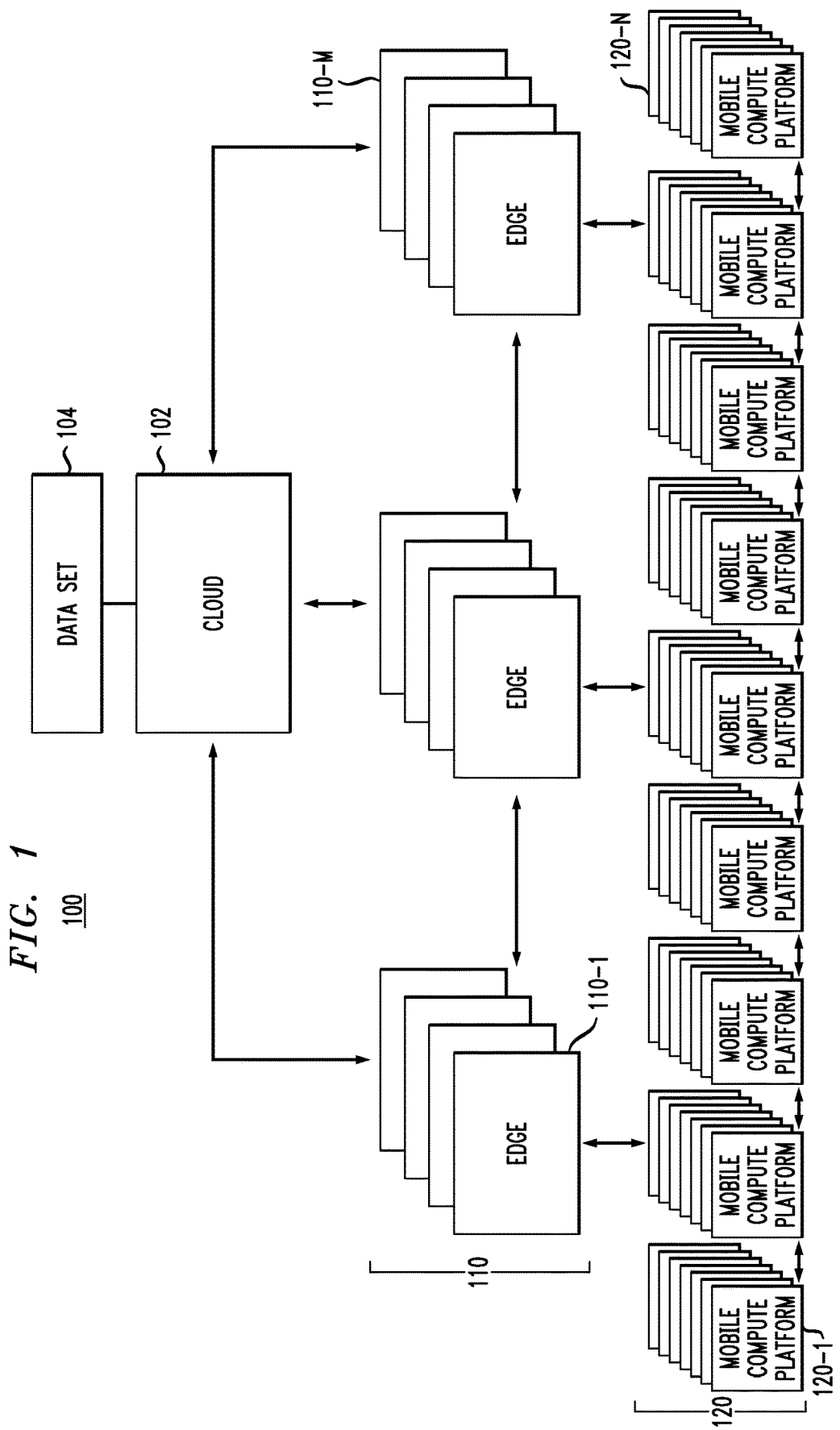
FIG. 1 illustrates a highly distributed system environment with which one or more illustrative embodiments are implemented.

Illustrative embodiments will be described herein with reference to exemplary information processing systems and associated host devices, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising edge computing systems, cloud computing systems, as well as other types of processing systems comprising various combinations of physical and virtual computing resources.

Cloud infrastructure is typically configured to centrally host multiple tenants that share cloud computing resources. Such systems are considered examples of what are more generally referred to herein as cloud computing environments. Some cloud infrastructures are within the exclusive control and management of a given enterprise, and therefore are considered "private clouds." The term "enterprise" as used herein is intended to be broadly construed, and may comprise, for example, one or more businesses, one or more corporations or any other one or more entities, groups, or organizations. An "entity" as illustratively used herein may be a person or system. On the other hand, cloud infrastructures that are used by multiple enterprises, and not necessarily controlled or managed by any of the multiple enterprises but rather are respectively controlled and managed by third-party cloud providers, are typically considered "public clouds." Thus, enterprises can choose to host their applications or services on private clouds, public clouds, and/or a combination of private and public clouds (hybrid clouds) with a vast array of computing resources attached to or otherwise a part of such IT infrastructure.

However, as mentioned above, there is a technology trend of moving away from exclusive use of cloud infrastructure. In fact, it has been predicted that less than 25 percent of data generated within the next few years will flow through a cloud-based data center. Rather, it is further predicted that a large percentage of such data will flow through some type of edge computing system of computing resources distributed across a geographic environment. In many scenarios, these computing resources are mobile and may be referred to as mobile compute platforms (MCPs). In certain mobile networks, these mobile compute platforms reside in or on a vehicle (e.g., "connected-car" environment as will be further explained below). The mobile compute platforms, along with servers (e.g., edge servers) that communicate with the mobile compute platforms, collectively form a highly distributed system. Mobile compute platforms may be in a variety of forms including, but not limited to, employee mobile devices, customer mobile devices, vehicles (e.g., drones, planes, cars, trucks, other shipping transports, etc.), Internet of Things (IoT) devices (e.g., sensors, tags, other monitoring or display systems, etc.), etc. Furthermore, edge servers typically communicate with one or more cloud platforms such that data can be received from a given cloud platform and sent to one or more mobile compute platforms, as well as received from one or more mobile cloud platforms and sent to a given cloud platform.

The term "computing resource," as illustratively used herein, can refer to any device, endpoint, component, element, or other resource, that is capable of performing processing and/or storage functions and is capable of communicating with the system. As mentioned above, non-limiting examples of such mobile compute platforms include employee mobile devices, customer mobile devices, vehicles (e.g., drones, planes, cars, trucks, other shipping transports, etc.), Internet of Things (IoT) devices (e.g., sensors, tags, other monitoring or display systems, etc.), etc.

However, it is realized herein that long-running application programs (e.g., applications that typically require multiple hours to process data) executing in locations such as, but not limited to, hospitals, universities, homes, vehicles, etc., require the type of powerful compute, network, and data resources typically found only in cloud-based data centers. Still further, it is realized herein that aggregating the increasingly powerful compute resources being installed in vehicles is an advantageous way to satisfy a wide variety of application requirements. However, it is further realized herein that long-running applications attempting to leverage aggregated connected MCP resources can experience many challenges. Some of these challenges in the context of a connected-car environment are as follows.

Car mobility. Due to the transient nature of existing edge computing systems where the availability of computing resources (e.g., MCPs in cars) is constantly changing and generally unpredictable, longer running jobs (e.g., analyzing smart utility usage for the last 24 hours and comparing against historical totals) can never, or are unlikely to, complete in such an environment.

High-Speed All-to-All Networking Support. Some distributed applications require that all nodes solving the problem communicate quickly with all other nodes and come to a consensus (e.g., a distributed ledger or blockchain system that utilizes a consensus protocol before committing a transaction to the ledger or blockchain). Moving cars cannot support these algorithms due to cars continually going out of range of the ad-hoc network. Parked cars may also not have direct connections to all other cars around them (thus precluding the ability to support all-to-all messaging).

Daily variability of available compute capabilities of a connected-car environment. Cars aggregate together for any number of reasons, including overnight parking, large event attendance, parking during work hours, etc. There is no guarantee on a daily basis that the same number of cars (with the same number of computing resources) will be available on a consistent basis.

Locating connected-car clusters with idle capacity. Given this daily variability of available connected-car resources, if a user wishes to locate a set of idle vehicles with sufficient aggregate and available compute capacity, there is currently no directory of these resources, nor is there existing management and orchestration capability to: (a) find those vehicles; and (b) deploy onto those vehicles.

Pricing connect-car clusters with idle capacity. In addition to the fact that there are no existing algorithms for locating and placing applications onto idle clusters of cars, there is also no existing way to get a price quote (e.g., $/minute for CPU, network, bandwidth, etc.) for running a job on a given set of connected cars.

Payment for usage of compute resources. There is also no existing mechanism for automatically paying for the resources used by the application owner. This includes payment to each owner of every connected car that participated in the compute exercise.

Illustrative embodiments overcome the above and other drawbacks by providing techniques for management of ad-hoc computation systems in mobile networks. Before describing such techniques, a highly distributed system that employs an edge computing paradigm will first be explained in the context of FIG. 1.

As shown in FIG. 1, highly distributed system environment 100 comprises a cloud platform 102 that contains a data set 104 that the cloud platform seeks to push out, through an intermediary layer 110 with a plurality of edge servers 110-1 through 110-M, to computing resources in a bottom layer 120 that are part of a plurality of mobile compute platforms (MCPs) 120-1 through 120-N. Note that the cloud platform 102 and the edge servers 110-1 through 110-M may be considered computing resources as well. The cloud platform 102 may comprise a public cloud or a private cloud. Examples of public clouds may include, but are not limited to, Amazon Web Services® (AWS), Google Compute Engine® (GCE), and Microsoft Azure® Services platforms. The highly distributed system environment may employ heterogeneous and varied network connections, from carrier-grade service level agreement (SLA)-capable networks to torrent-like, peer-to-peer networks.

Furthermore, the highly distributed system environment may comprise communication connections (links) associated with one or more wireless networks such as one or more cellular networks and one or more local wireless networks such as, e.g., WiFi networks. For example, one or more of MCPs 120-1 through 120-N may be in communication with other computing resources in the system environment 100 (e.g., one or more other of MCPs 120-1 through 120-N, one or more edge servers 110-1 through 110-M, cloud platform 102, and/or one or more other devices not expressly shown in FIG. 1) via one or more communication links as will be further explained.

Highly distributed system environment 100 in FIG. 1 represents a variety of use cases in which frequent downloads of massive data sets occurs to MCPs. For example, it may be necessary or desired to download a large data set to a set of MCPs comprising passenger vehicles (e.g., cars), drones, shipping vehicles, employee devices, etc. It is to be appreciated that many of these MCP devices are compute-constrained (e.g., configured with limited processing capabilities, as well as with limited storage, network, and other resource-related capabilities). The data being transferred may represent any kind of data, by way of example only, new software downloads, maps, customer information, weather pattern data, etc. Such data is used by one or more application programs executing on one or more of the MCPs 120-1 through 120-N. Note that while illustrative descriptions herein focus on data download use cases (i.e., data transferring from the cloud platform 102 to MCPs 120-1 through 120-N), the same architecture shown in highly distributed system environment 100 may be used for data upload use cases (i.e., data transferring from MCPs 120-1 through 120-N to the cloud platform 102) as well.

For example, in illustrative embodiments, FIG. 1 represents a "connected-car" system environment that comprises a network of MCPs residing in autonomous cars (self-driven vehicles) and/or non-autonomous cars (human-driven vehicles) that are configured to receive data from and send data to: (i) fixed (stationary) computing resources such as edge servers; (ii) one or more other MCPs; and/or (iii) other computing resources. In some embodiments, data that is transferred in the system environment can originate and/or terminate at a cloud platform (e.g., cloud platform 102) depending on the direction of data flow. The communication capabilities of a connected car and edge servers can include cellular and local wireless (e.g., WiFi) communication equipment for sending and receiving data.

Illustrative embodiments will now be described in the context of a highly distributed system such as system 100 in FIG. 1. However, it is to be understood that embodiments are not limited to the system architecture of FIG. 1 and may rather be implemented in other system architectures.

More particularly, illustrative embodiments provide improved techniques for forming ad-hoc computation systems in mobile networks. Such ad-hoc computation systems, while not limited thereto, are particularly well suited to address the issue of application programs that require extended execution times within a connected-car system environment. As will be further explained, once an application program (e.g., through an application server) advertises itself as in need of a certain amount of computing resources for a certain amount of time, illustrative embodiments form a "data-center-like" orchestration system to run the application on idle connected cars. By "idle" here it is illustratively meant that the vehicles, while otherwise mobile, are not currently moving (e.g., in one or more illustrative embodiments, the vehicles are parked). In some embodiments, the idle cars form one or more connected-car cluster configurations. In other embodiments, one or more ad-hoc portals are used to manage the application execution and registration of the cars that will take part in the execution task.

With reference back to FIG. 1, in illustrative embodiments, MCPs 120-1 through 120-N represent connected cars, edge servers 110-1 through 110-M represent ad-hoc portals, and cloud platform 102 represents an application server. However, it is to be appreciated that the connected-car example is one example of the type of MCPs with which ad-hoc computation techniques described herein can be implemented.

Figure 2:
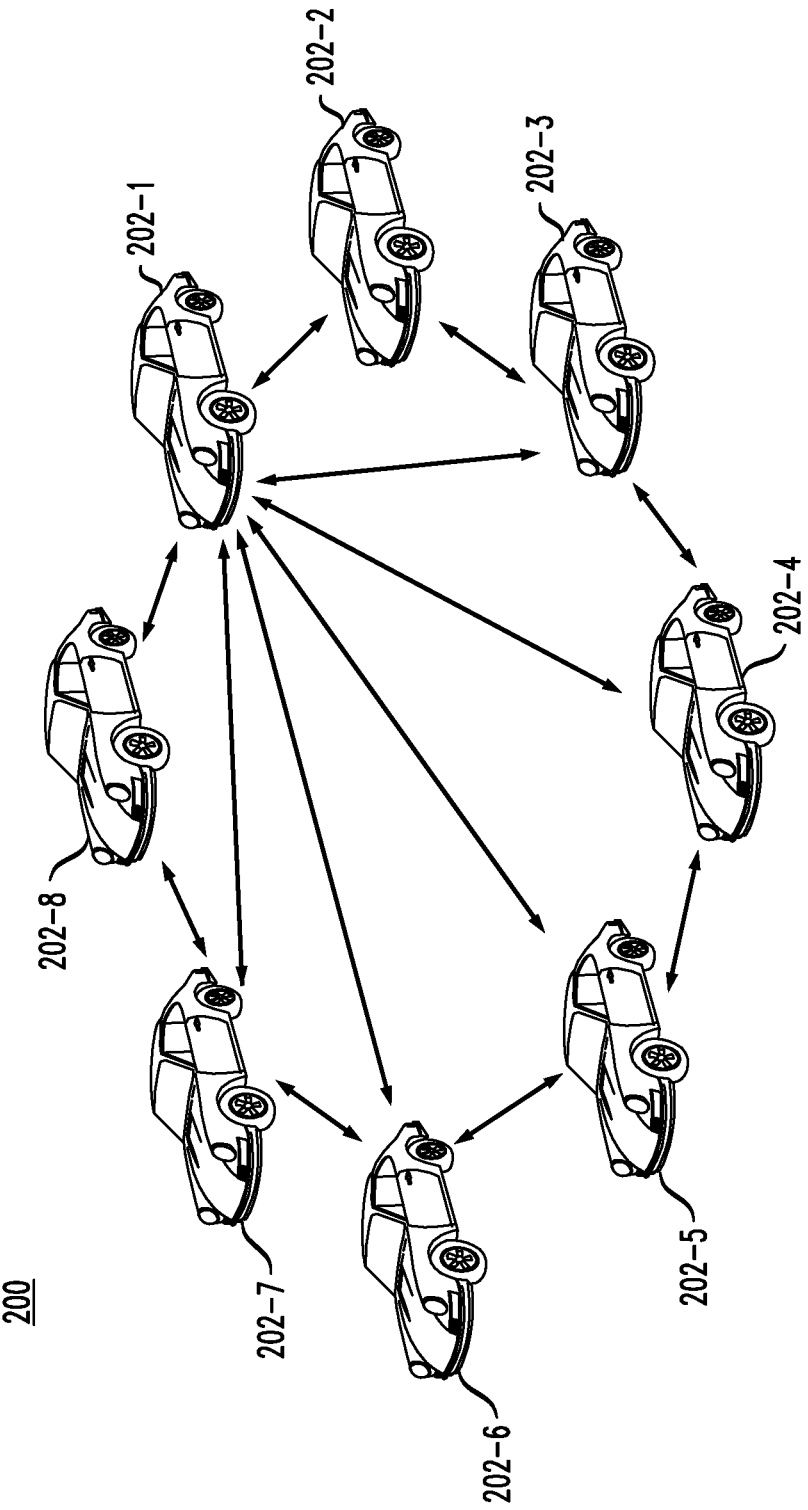
FIG. 2 illustrates an ad-hoc computation system according to an illustrative embodiment.
Figure 3:
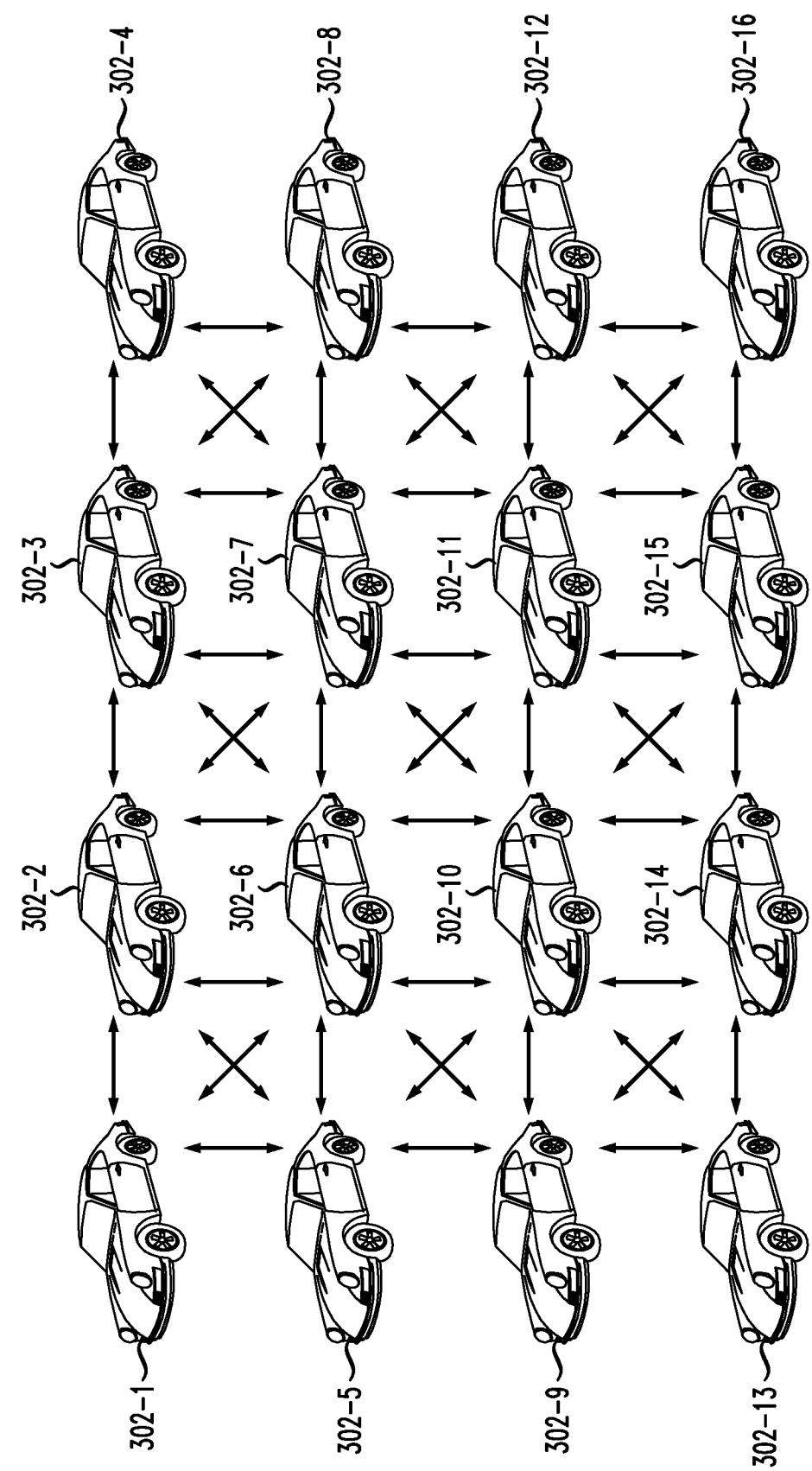
FIG. 3 illustrates an ad-hoc computation system according to another illustrative embodiment.

Furthermore, illustrative embodiments provide for connected-car configurations (i.e., clusters) that can be employed to execute one or more application programs. FIGS. 2 and 3 illustrate two example configurations which will now be explained.

FIG. 2 illustrates a circular cluster of mobile compute platforms forming an ad-hoc computation system according to an illustrative embodiment. More particularly, FIG. 2 illustrates a cluster 200 of connected cars (with MCPs residing therein) 202-1 through 202-8 that have been parked in a circular pattern to promote all-to-all connectivity. The communication between the cars, in one or more illustrative embodiments, is beam-based which is a wireless connection that is made between any two cars MCPs when they are within a given proximity of one another. The given proximity depends, for example, on the strength of the wireless signals which the MCPs are configured to transmit. This type of communication cluster can occur in any location but is more likely to occur, for example, in an outdoor parking lot as opposed to a parking garage due to parking constraints and/or poor wireless connectivity within a parking garage. Note that such a circular cluster 200 can have more or less cars than what is shown in FIG. 2 at any given time. Further, while only car 202-1 is shown being directly connected to all the other cars in the cluster (arrows representing communication links), it is to be understood that each other car is assumed to be directly connected to each other car as well (for simplicity, the additional arrows are not shown). However, in some embodiments, it is to be understood that a given car among cars 202-1 through 202-8 can be connected to another one of the cars through one or more other cars (i.e., without a direct connection).

In any case, each car is configured to advertise its availability to be leveraged by a distributed application that requires all-to-all messaging (e.g., consensus). The application is distributed among one or more of the respective MCPs residing in connected cars 202-1 through 202-8. As will be described below, such connected cars can also advertise this capability for an increased fee.

As an alternative to circular, beam-based parking (as shown in FIG. 2), cars can have grid-based communication and park in a traditional parking lot or garage. FIG. 3 illustrates a grid-based cluster of connected cars forming an ad-hoc computation system according to another illustrative embodiment. More particularly, FIG. 3 illustrates a cluster 300 of connected cars (with MCPs residing therein) 302-1 through 302-16 that have been parked in a grid-based pattern. In illustrative embodiments, the inter-car communication is based on physical connectivity (e.g., cars can connect to each other by a wired communication system that is resident in the parking garage and to which each car physically connects during idle periods, e.g., charging stations with fiber channel communication), or beam-based (proximity-based wireless connection) connectivity as explained above in the context of FIG. 2. The FIG. 3 arrangement may be more suitable for the communication requirements of certain applications.

Thus, in accordance with configurations 200 (FIG. 2) and 300 (FIG. 3), data transfer and location of execution of the application is optimized in advance knowing which cars in which locations will be used to execute an application. Such optimization is referred to herein as "spatial optimization," i.e., maximizing the number of MCPs available to execute an application for the needed amount of time. It is to be appreciated that, in alternative embodiments, other MCP configurations other than those shown in FIGS. 2 and 3 can be employed to provide spatial optimization in alternative embodiments.

Referring now to FIG. 4, an ad-hoc computation system is shown with multiple clusters and ad-hoc portals according to an illustrative embodiment. More particularly, as shown, ad-hoc computation system 400 comprises a plurality of connected-car clusters 410-1, 410-2, 410-3, and 410-4. Note that, by way of example only, connected-car clusters 410-1 and 410-4 are in a circular-based configuration (FIG. 2) while connected-car clusters 410-2 and 410-3 are in a grid-based configuration (FIG. 3). Further, each cluster has associated with it an ad-hoc portal with which each car in the associated cluster is in communication (wired and/or wireless), i.e., connected-car cluster 410-1 is associated with ad-hoc portal 412-1, connected-car cluster 410-2 is associated with ad-hoc portal 412-2, connected-car cluster 410-3 is associated with ad-hoc portal 412-3, and connected-car cluster 410-4 is associated with ad-hoc portal 412-4. Also shown in FIG. 4 is application server 414, which is in communication (wired and/or wireless) with each one of ad-hoc portals 412-1 through 412-4. In illustrative embodiments, ad-hoc portals 412-1 through 412-4 and application server 414 are static (i.e., fixed or stationary). In this example, it is assumed that each one of connected-car clusters 410-1 through 410-4 is located at a parking lot or garage at respective corners of intersection 416 of two roadways. Each parking lot/garage thus has a static ad-hoc portal. Note also that the locations and arrangements of the clusters shown in FIG. 4 are illustrative in nature and can be different in alternative embodiments. It is to be further appreciated that the ad-hoc computation system 400 can have more or less connected-car clusters in different locations and arrangements. Further, in some embodiments, each connected-bar cluster can have more than one ad-hoc portal associated therewith, while in other embodiments, one ad-hoc portal is associated with more than one connected-car cluster.

Thus, advantageously, wherever communities of connected cars are able to congregate together (e.g., daytime corporate parking lots, apartment parking garages, city lots, on-street resident parking, etc.), an ad-hoc portal (such as 412-1 through 412-4) can be positioned that serves as a gateway for advertising ad-hoc compute capabilities. As cars pull into their parking spots in the given parking area, they register their presence and their compute capabilities with the ad-hoc portal. In one or more embodiments, ad-hoc portals are located in a parking garage, e.g., one per floor or per aisle. The ad-hoc portals, in some embodiments, are aware if the cars have physical connectivity (e.g., they are plugged into a charger which may also connect the car to a fiber channel network) and can communicate therewith using the physical connection. In other embodiments, wireless communication between the ad-hoc portals and cars is employed.

In one or more embodiments, one or more of ad-hoc portals 412-1 through 412-4 are themselves configured with significant computing resource capabilities. By way of example only, one or more of ad-hoc portals 412-1 through 412-4 can be configured with compute, storage, and network capabilities such as those available in a VMAX system ("fire hydrant") from Dell EMC.

Furthermore, in accordance with one or more embodiments, a car registration process includes a negotiation procedure. That is, when an arriving car seeks to becomes part of a cluster (e.g., 410-1 through 410-4), the car participates in a negotiation process with the ad-hoc portal associated with that cluster (e.g., one of 412-1 through 412-4) for payment for compute, storage, and/or network services rendered during car idle time. For example, the given car expresses a desired price it is willing to accept (dollar per processing device per minute or $/CPU/min), or the ad-hoc portal dictates a price that it will allow the car to collect. Still further, during the negotiation procedure, the payment methodology and payment entity (e.g., traditional bank accounts, crypto-currency wallets, etc.) for each car are also recorded by the ad-hoc portal. As such, specified penalties can then be automatically collected if a car owner drives away during a compute task and leaves the ad-hoc portal (or other cars) to complete the job.

Still further, in illustrative embodiments, application server 414 seeking to execute a given application program queries the network of static ad-hoc portals (e.g., 412-1 through 412-4, however, the query can go out to all ad-hoc portals within a predefined geographic area such as, for example, a city) to locate the appropriate amount of connected cars, with the appropriate amount of compute capacity, that will likely be available within one or more locations for the appropriate amount of time to fully execute the application program. In addition, the various ad-hoc portals advertise billing terms (as negotiated between the ad-hoc portals and the cars in their corresponding clusters) to application server 414.

In additional embodiments, data needed for executing an application (for example, images to run a deep learning algorithm) is preloaded to one or more connected cars, or to the corresponding ad-hoc portal, so that the data will be in proximity to the cars when running the algorithms. Since some cars will have large amounts of storage, some of the car storage is used to store data for such algorithms.

Based on historical patterns of connected-car compute usage (which are compiled by one or more of application server 414, ad-hoc portals 412-1 through 412-4, or some other computing device), application and data deployment by the application server 414 is planned in advance and assigned to specific cars at specific locations. For example, for cars that regularly arrive at specific locations and remain idle there for predicable time periods (e.g., a car of a commuter that regularly arrives at a train station parking garage at 6:30 am and leaves at 6:30 pm based on the work schedule of the commuter), these cars are able to execute a single workload during one contiguous time period since they have the data in advance and are in the same location during the entirety of the workload execution. However, based on the recorded historical patterns, it is to be appreciated that the same car does not necessarily have to remain for the entirety of the workload execution since the application server 414 will know its schedule and account for that in its application and data deployment plan.

Furthermore, in one or more embodiments, upon completion of a job (e.g., workload execution), electronic payments are automatically transferred to each ad-hoc portal which has cars involved in the job, which in turn automatically transfers the electronic payments to the cars involved.

Advantageously, illustrative embodiments therefore provide for formation of a data-center-like computation system, on demand, from parked vehicles able to run a required application, and also provide for optimization of both the data transfer to this connect-car environment, optimization of the car-to-car communication infrastructure for all-to-all connectivity workloads, and orchestration of the ad-hoc computation system to optimize data movement. The ad-hoc portals thus form a directory of available connected-car compute environments across a region which enables an application server to locate and utilize available resources.

Given the illustrative description of ad-hoc computation techniques described herein, methodology 500 in FIG. 5A comprises the following steps from the overall perspective of an ad-hoc computation system.

Step 502: An ad-hoc computation system is formed from one or more clusters of idle mobile computing resources to execute an application program within a given time period. The forming step further comprises: (i) determining at least a subset of idle mobile computing resources from the one or more clusters of idle mobile computing resources that are available, or likely to be available, to execute the application program within the given time period, and that collectively comprise computing resource capabilities sufficient to execute the application program within the given time period; and (ii) distributing a workload associated with the execution of the application program to the subset of idle mobile computing resources.

Step 504: The workload associated with the application program is executed via the subset of idle mobile computing resources forming the ad-hoc computation system.

Methodology 510 in FIG. 5B comprises the following steps from the perspective of a given idle mobile computing resource (e.g., a given MCP in a given cluster of MCPs).

Step 512: A given idle mobile computing resource advertises computing resource capabilities associated therewith to an ad-hoc computation system in order to join a cluster of idle mobile computing resources formed to execute a workload associated with an application program within a given time period.

Step 514: The given idle mobile computing resource negotiates a price with the ad-hoc computation system for using its associated computing resource capabilities to execute at least a portion of the workload associated with the application program.

Step 516: The given idle mobile computing resource executes at least a portion of the workload associated with the application program after the advertising and negotiating steps.

Figure 5C:
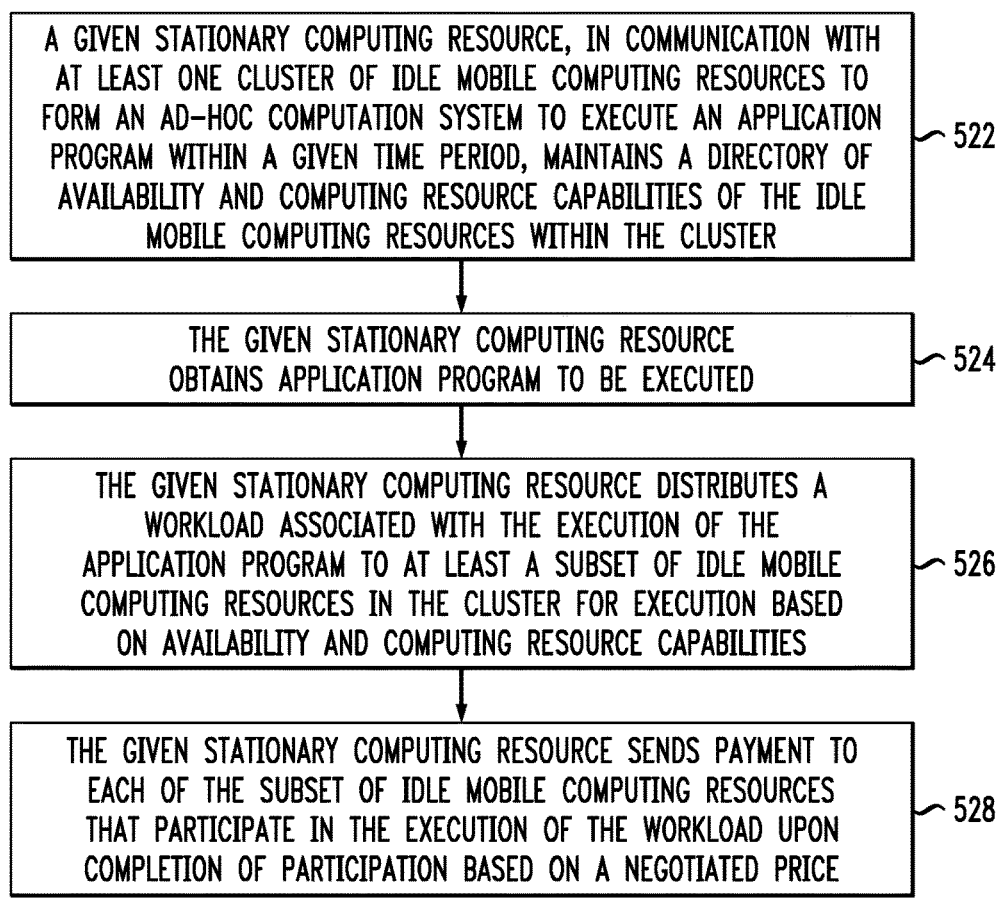

Methodology 520 in FIG. 5C comprises the following steps from the perspective of a given stationary mobile computing resource (e.g., a given ad-hoc portal associated with a a given cluster of MCPs).

Step 522: A given stationary computing resource, in communication with at least one cluster of idle mobile computing resources to form an ad-hoc computation system to execute an application program within a given time period, maintains a directory of availability and computing resource capabilities of the idle mobile computing resources within the cluster.

Step 524: The given stationary computing resource obtains the application program to be executed.

Step 526: The given stationary computing resource distributes a workload associated with the execution of the application program to at least a subset of idle mobile computing resources in the cluster for execution based on availability and computing resource capabilities.

Step 528: The given stationary computing resource sends payment to each of the subset of idle mobile computing resources that participate in the execution of the workload upon completion of participation based on a negotiated price.

At least portions of the system for ad-hoc computation shown in FIGS. 1-5C may be implemented using one or more processing platforms associated with one or more information processing systems. In some embodiments, a given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one. In many embodiments, logic may be executed across one or more physical or virtual processors. In certain embodiments, a virtual processor may be mapped to and executed on or across a portion of one or more virtual or physical processors.

As is apparent from the above, one or more of the processing modules or other components of the system for ad-hoc computation shown in FIGS. 1-5C may each run on a computer, server, storage device or other processing platform element. A given such element may be viewed as an example of what is more generally referred to herein as a "processing device." An example of such a processing platform is processing platform 600 shown in FIG. 6.

The processing platform 600 in this embodiment comprises a plurality of processing devices, denoted 602-1, 602-2, 602-3, . . . , 602-N, which communicate with one another over a network 604.

The network 604 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

As mentioned previously, some networks utilized in a given embodiment may comprise high-speed local networks in which associated processing devices communicate with one another utilizing Peripheral Component Interconnect Express (PCIe) cards of those devices, and networking protocols such as InfiniBand, Gigabit Ethernet or Fibre Channel.

The processing device 602-1 in the processing platform 600 comprises a processor 610 coupled to a memory 612.

The processor 610 may comprise a microprocessor, a microcontroller, an application-specific integrated circuit (ASIC), a field-programmable gate array (FPGA) or other type of processing circuitry, as well as portions or combinations of such circuitry elements.

The memory 612 may comprise random access memory (RAM), read-only memory (ROM) or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered embodiments of the present disclosure. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Figure 6:
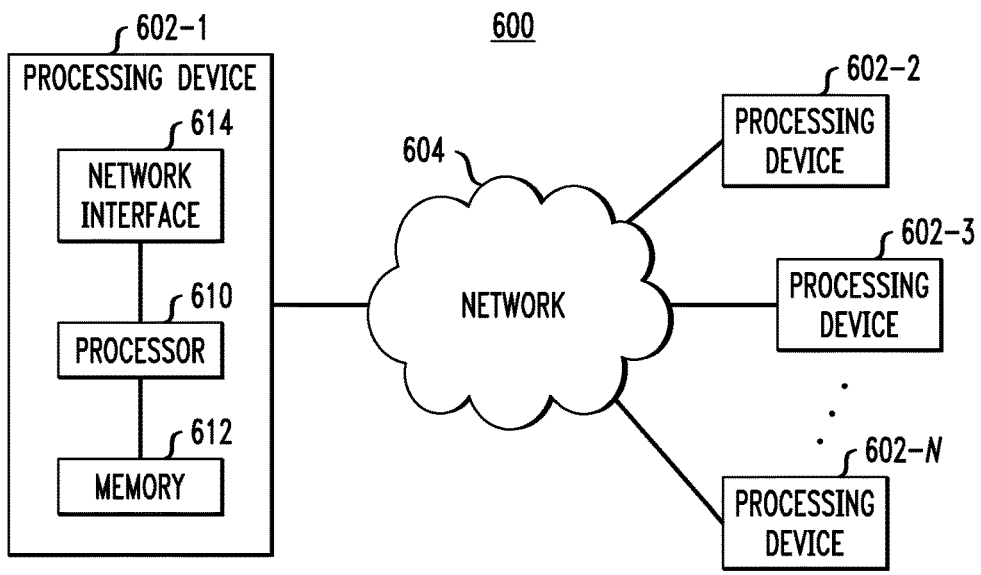
FIG. 6 illustrates a processing platform used to implement an ad-hoc computation system according to an illustrative embodiment.

Also included in the processing device 602-1 of the example embodiment of FIG. 6 is network interface circuitry 614, which is used to interface the processing device with the network 604 and other system components and may comprise conventional transceivers.

The other processing devices 602 of the processing platform 600 are assumed to be configured in a manner similar to that shown for processing device 602-1 in the figure.

Again, this particular processing platform is presented by way of example only, and other embodiments may include additional or alternative processing platforms, as well as numerous distinct processing platforms in any combination, with each such platform comprising one or more computers, servers, storage devices or other processing devices.

For example, other processing platforms used to implement embodiments of the disclosure can comprise different types of virtualization infrastructure, in place of or in addition to virtualization infrastructure comprising virtual machines. Such virtualization infrastructure illustratively includes container-based virtualization infrastructure configured to provide Docker containers or other types of Linux containers (LXCs).

The containers may be associated with respective tenants of a multi-tenant environment of the system for ad-hoc computation, although in other embodiments a given tenant can have multiple containers. The containers may be utilized to implement a variety of different types of functionality within the system. For example, containers can be used to implement respective compute nodes or storage nodes of a computing and storage system. The compute nodes or storage nodes may be associated with respective tenants of a multi-tenant environment. Containers may be used in combination with other virtualization infrastructure such as virtual machines implemented using a hypervisor.

As another example, portions of a given processing platform in some embodiments can comprise converged infrastructure such as VxRail™, VxRack™ or Vblock® converged infrastructure commercially available from VCE, the Virtual Computing Environment Company, now the Converged Platform and Solutions Division of Dell EMC. For example, portions of a system of the type disclosed herein can be implemented utilizing converged infrastructure.

It should therefore be understood that in other embodiments different arrangements of additional or alternative elements may be used. In many embodiments, at least a subset of these elements may be collectively implemented on a common processing platform, or each such element may be implemented on a separate processing platform.

Also, in other embodiments, numerous other arrangements of computers, servers, storage devices or other components are possible in the system for ad-hoc computation. Such components can communicate with other elements of the system over any type of network or other communication media.

As indicated previously, in some embodiments, components of the system for ad-hoc computation as disclosed herein can be implemented at least in part in the form of one or more software programs stored in memory and executed by a processor of a processing device. For example, at least portions of the execution environment or other system components are illustratively implemented in one or more embodiments the form of software running on a processing platform comprising one or more processing devices.

It should again be emphasized that the above-described embodiments of the disclosure are presented for purposes of illustration only. Many variations and other alternative embodiments may be used. For example, the disclosed techniques are applicable to a wide variety of other types of systems for ad-hoc computation. Also, the particular configurations of system and device elements, associated processing operations and other functionality illustrated in the drawings can be varied in other embodiments. Moreover, the various assumptions made above in the course of describing the illustrative embodiments should also be viewed as exemplary rather than as requirements or limitations of the embodiments. Numerous other alternative embodiments within the scope of the appended claims will be readily apparent to those skilled in the art.

What is claimed is:

1. A method comprising:
forming an ad-hoc computation system from one or more clusters of idle mobile computing resources to execute an application program within a given time period, wherein the forming step further comprises:
   determining at least a subset of idle mobile computing resources from the one or more clusters of idle mobile computing resources that are available, or likely to be available, to execute the application program within the given time period, and that collectively comprise computing resource capabilities sufficient to execute the application program within the given time period; and
   distributing a workload associated with the execution of the application program to the subset of idle mobile computing resources; and
executing the workload associated with the application program via the subset of idle mobile computing resources forming the ad-hoc computation system;
wherein the subset of idle mobile computing resources includes vehicles having mobile compute platforms;
wherein forming the ad-hoc computation system comprises registering each vehicle with an ad-hoc portal associated with the one or more clusters of idle mobile computing resources of the ad-hoc computation system, the ad-hoc portal positioned at a location permitting communication with the vehicles through the mobile compute platforms thereof; and
wherein, upon registration, the subset of idle mobile computing resources is available to execute the application program.

2. The method of claim 1, wherein at least one of the one or more clusters of idle mobile computing resources comprises idle mobile computing resources connected in a circular-based configuration.

3. The method of claim 1, wherein at least one of the one or more clusters of idle mobile computing resources comprises idle mobile computing resources connected in a grid-based configuration.

4. The method of claim 1, wherein at least one of the one or more clusters of idle mobile computing resources comprises idle mobile computing resources connected via a wired communication network.

5. The method of claim 1, wherein at least one of the one or more clusters of idle mobile computing resources comprises idle mobile computing resources connected via a wireless communication network.

6. The method of claim 1, wherein the ad-hoc computation system forming step further comprises at least a portion of the idle mobile computing resources in the one or more clusters of idle mobile computing resources advertising, prior to the determining step, their respective computing resource capabilities to execute at least a portion of the workload associated with the application program.

7. The method of claim 1, wherein the ad-hoc computation system forming step further comprises at least a portion of the idle mobile computing resources in the one or more clusters of idle mobile computing resources negotiating, prior to the determining step, a price for using their respective computing resource capabilities to execute at least a portion of the workload associated with the application program.

8. The method of claim 7, further comprising the idle mobile computing resources that participate in the execution of the workload associated with the application program automatically receiving payment upon completion of their participation based on their negotiated price.

9. The method of claim 1, wherein the determining and distributing steps are performed in accordance with one or more ad-hoc portals associated with the one or more clusters of idle mobile computing resources.

10. The method of claim 9, further comprising the step of the one or more ad-hoc portals maintaining one or more respective directories of availability and computing resource capabilities of the idle mobile computing resources within their corresponding clusters.

11. The method of claim 9, further comprising the step of the one or more ad-hoc portals preloading data, used to execute the workload associated with the application program, to one or more of the idle mobile computing resources within their corresponding clusters.

12. The method of claim 1, wherein at least one of the one or more clusters of idle mobile computing resources is located in a parking area within a given geographic region.

13. A method comprising:
a given idle mobile computing resource advertising computing resource capabilities associated therewith to an ad-hoc computation system in order to join a cluster of idle mobile computing resources formed to execute a workload associated with an application program within a given time period;
the given idle mobile computing resource negotiating a price with the ad-hoc computation system for using its associated computing resource capabilities to execute at least a portion of the workload associated with the application program; and
the given idle mobile computing resource executing at least a portion of the workload associated with the application program after the advertising and negotiating steps;
wherein the given idle mobile computing resource includes a vehicle having a mobile compute platform;
wherein the vehicle is registered with an ad-hoc portal associated with the cluster of idle mobile computing resources, the ad-hoc portal positioned at a location permitting communication with the vehicle through the mobile compute platform; and
wherein, upon registration, the given idle mobile computing resource is available to execute the workload associated with the application program.

14. An article of manufacture comprising a non-transitory processor-readable storage medium having stored therein program code of one or more software programs, wherein the program code when executed by at least one processing device causes the processing device to perform the steps of claim 13.

15. An apparatus comprising at least one processing device, wherein the at least one processing device comprises a processor coupled to a memory configured to enable the given idle mobile computing resource to perform the steps of claim 13.

16. A method comprising:
a given stationary computing resource, in communication with at least one cluster of idle mobile computing resources to form an ad-hoc computation system to execute an application program within a given time period, maintaining a directory of availability and computing resource capabilities of the idle mobile computing resources within the cluster;
obtaining the application program to be executed;
the given stationary computing resource distributing a workload associated with the execution of the application program to at least a subset of idle mobile computing resources in the cluster for execution based on availability and computing resource capabilities; and
sending payment to each of the subset of idle mobile computing resources that participate in the execution of the workload upon completion of participation based on a negotiated price;
wherein each of the subset of idle mobile computing resources in the cluster includes vehicles having mobile compute platforms;
wherein the vehicles are registered with an ad-hoc portal associated with the cluster, the ad-hoc portal positioned at a location permitting communication with the vehicles through the mobile compute platforms; and
wherein, upon registration, each of the subset of idle mobile computing resources is available to execute the application program.

17. The method of claim 16, further comprising, prior to obtaining the application program, the given stationary computing resource receiving a query from an application server associated with the application program, wherein the query is directed to the directory maintained by the given stationary computing resource to determine whether or not the cluster of idle mobile computing resources has sufficient availability and computing resource capabilities to execute the application program within the given time period.

18. An article of manufacture comprising a non-transitory processor-readable storage medium having stored therein program code of one or more software programs, wherein the program code when executed by at least one processing device causes the processing device to perform the steps of claim 16.

19. An apparatus comprising at least one processing device, wherein the at least one processing device comprises a processor coupled to a memory configured to enable the given stationary computing resource to perform the steps of claim 16.

20. The method of claim 1 wherein the step of forming includes forming the ad-hoc computation system comprising a network of ad-hoc portals, each ad-hoc portal being associated with a respective one of the one or more clusters of idle mobile computing resources; and wherein the step of determining includes determining, through the network of ad-hoc portals, an availability of the at least a subset of idle mobile computing resources from the respective ones of the one or more clusters of idle mobile computing resources.

\* \* \* \* \*